Jan. 31, 1956
J. A. LAUCK
2,732,852
CONTROL VALVE
Filed Feb. 27, 1951
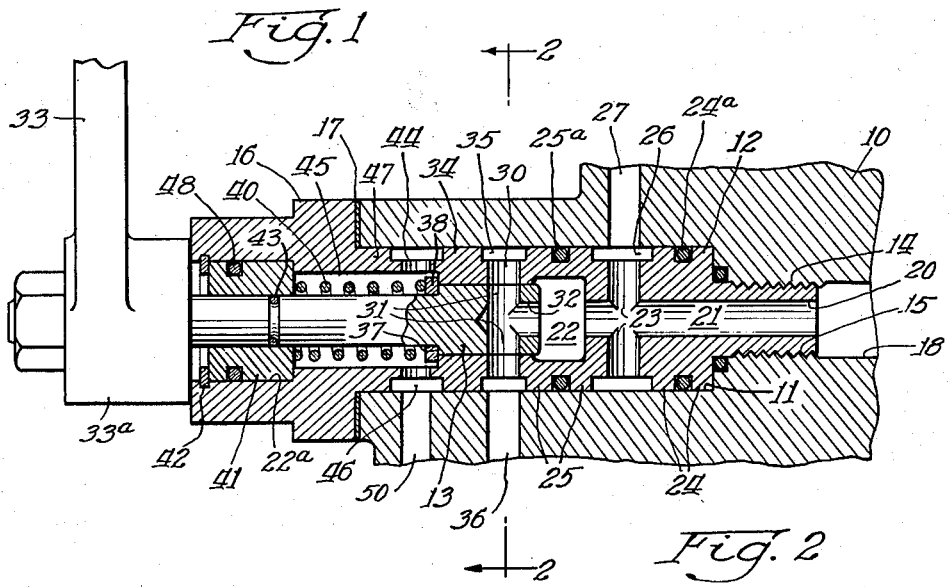
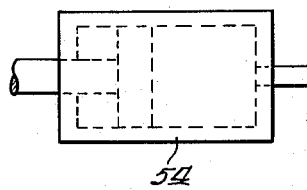
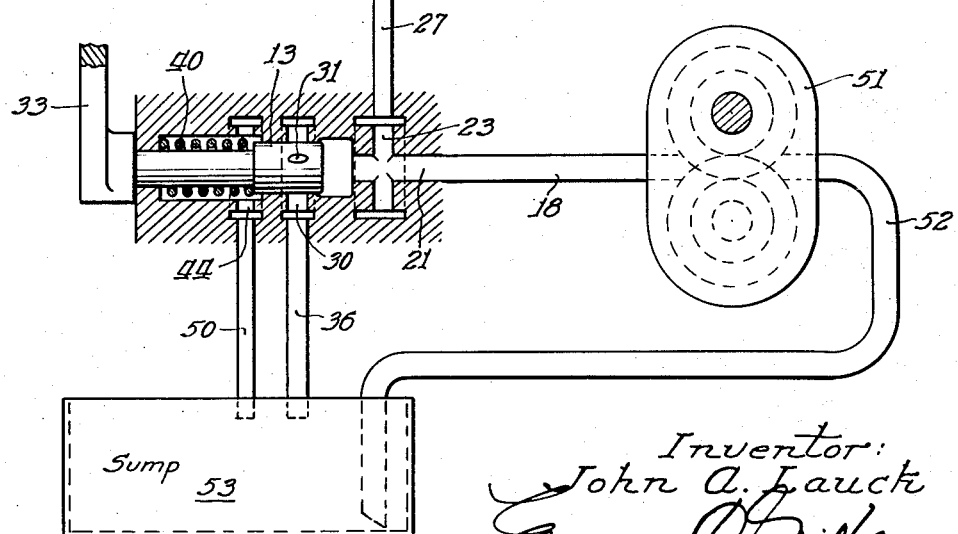
Inventor:
John A. Lauck
By Emard C. Fitzgerald
Atty.

United States Patent Office 2,732,852
Patented Jan. 31, 1956

2,732,852
CONTROL VALVE

John A. Lauck, Shaker Heights, Ohio, assignor to Borg-Warner Corporation, Chicago, Ill., a corporation of Illinois Application February 27, 1951, Serial No. 212,910

3 Claims. (Cl. 137—108)

This invention relates to a control valve, and more particularly to a three-way control valve incorporating a built-in relief valve.

The valve of the present invention is intended for use particularly with a hydraulic system wherein in a first position of the valve it is desirable that the valve bypass fluid applied to the inlet thereof while in a second position of the valve, fluid applied to the inlet thereof is applied to a utilization device and in this position the valve then becomes effective as a maximum pressure relief valve. In prior art devices it has been the usual practice to provide a control valve and a separate relief valve. The present invention not only reduces cost but in situations where weight and bulk are a consideration provides definite advantages over prior art devices.

An object of the present invention is to provide a new and improved control valve incorporating a built-in relief valve.

A further object of the present invention is to provide a three-way control valve wherein a single valve member is employed to provide both control of the application of fluid to a utilization device and also maximum pressure relief.

In accordance with one embodiment of this invention a three-way control valve for a hydraulic system may include a valve housing in which there is disposed a spring-pressed, axially shiftable valving member which is also rotatable therein to place the inlet port of the valve in communication with a port connected to the sump of the hydraulic system and rotatable to a second position wherein communication between the inlet and the sump return port is terminated. The valve is capable, also, of functioning as a relief valve, the valve shifting axially against compression force exerted by a control spring to place the inlet port in communication with the sump when the pressure applied to the valve motive surface exceeds a predetermined desired maximum value.

Other objects and advantages of the present invention will be apparent from the following detailed description taken in conjunction with the drawings wherein:

Fig. 1 is an axial, sectional view, partially in elevation, of a three-way control valve constructed in accordance with one embodiment of this invention;

Fig. 2 is a transverse, sectional view taken along the line 2—2 of Fig. 1; and

Fig. 3 is a semischematic view of a hydraulic system incorporating the three-way control valve of this invention.

Referring now to the drawings, reference numeral 10 designates a part of a housing block having formed therein an elongated, generally cylindrical chamber 11, which extends to the right from the left side of the block and within which chamber is received the valve assembly of this invention.

The valve assembly includes a sleeve-shaped valve guide 12, the right portion of which is received in the chamber 11 and which has journalled therein a valve 13. Valve 13 is both axially shiftable and rotatable in the guide 12 to provide different control functions. The right end of valve guide 12 is threaded as indicated at 14 and threadably engages a correspondingly threaded portion 15 of the housing 10. When the valve guide 12 is fully assembled in the chamber 11 in the housing 10, the right side of a flanged or shouldered portion 16 of the valve guide integrally formed therewith adjacent the left end portion thereof, seats firmly against the left side wall of the housing 10, a gasket 17 being interposed between the right side of shoulder 16 and the side wall of housing 10 to prevent leakage.

Pressure is admitted to the valve assembly through a passage 18 provided in the housing 10 and connecting at its left end, as viewed in Fig. 1, with an inlet port 20 provided at the right end of the valve guide 12. Passage 18 may be connected to a suitable pressure source such as the gear pump in the hydraulic system illustrated in Fig. 3. The sleeve-shaped valve guide 12 has an axially extending inlet chamber 21 formed therein which communicates at its right end with the inlet port 20 and which extends to the left to communicate at its left end with the right end of valve chamber 22. Valve chamber 22, in the embodiment illustrated, is axially aligned with inlet chamber 21 and has a somewhat larger diameter.

A first set of transversely extending ports 23 are formed in the right end portion of valve guide 12. These ports 23 are always in communication with the inlet chamber 21 and thus with the inlet port 20. A first pair of spaced ridges or flanges 24 is formed about the periphery of valve guide 12 and located on the right side of the ports 23, as viewed in Fig. 1, while a second pair of spaced ridges or flanges 25 are also formed about the periphery of the valve guide and are located to the left of the radially extending ports 23. The adjacent ridges 24 and 25 located, respectively, on either side of the ports 23 define with the side wall of the chamber 11 and the periphery of the guide 12 an annular passage 26 extending about the periphery of the valve guide 12 and communicating at its upper side, as viewed in this figure, with an outlet passage 27 formed in the housing 10, which passage may be connected to any suitable utilization device such as the hydraulic motor 54 illustrated in Fig. 3. The ridges of each pair provide therebetween channels in which are received O-ring sealing members 24a and 25a, respectively, to prevent leakage.

A second set of transversely extending ports 30 is formed in the valve guide 12 immediately to the left of the left one of the pair of flanges 25 and to the left of the right end of the valve 13, in the position illustrated in Fig. 1. This second set of ports is placed in communication with the inlet chamber 21 and port 20 only when the valve 13 is rotated to place in alignment with these ports a pair of oppositely extending, transverse passages 31 formed in the right end portion of the valve 13 and communicating at their inner ends with a further axially located passage 32 extending through to the right end of the valve 13. Rotation of valve 13 is performed by pivoting a lever 33 which is fixed to the left end of valve 13, the left end of valve 13 extending somewhat beyond the left end of guide 12. Hub 33a, when valve lever 33 is in the position illustrated in Fig. 1, bears at its right side against the left end of guide 12 and establishes the rightmost position of valve 13 in the guide 12. Flange 34 formed about the periphery of guide 12 and located to the left of ports 30 defines with the left one of the flange 25 and the adjacent walls of the guide and the chamber 11 a second annular passage 35 which is connected to one end of a sump return 36 formed in housing 11.

It will be seen from Fig. 1 that slightly to the left of the right end portion of valve 13, which right end portion is apertured to provide the passages 31 and 32, the stem of the valve is reduced to define a shoulder face 37 against which a bearing ring 38 is urged by the abutting right end of a helically coiled spring 40, disposed about the stem portion of the valve 13. The left end of the spring 40 bears against the right side of an annular retaining member 41 which is received in a somewhat enlarged left end portion 22a of the valve chamber 22 and is retained therein by snap ring 42 received in a suitable groove formed in the inner side wall of guide 12 adjacent the left end of chamber 22a. It will be apparent that the valve 13 is normally urged to the right by the spring 40. It will also be apparent that when the ports 31 and 30 are not in alignment, pressure may build up within the right end of the valve chamber 22 and that this pressure being exerted against the right end of the valve 13 may, if it exceeds the oppositely directed force of spring 40, cause the valve to move to the left to place the sump discharge ports 30 in communication with the then exposed left end of the inlet chamber 21 of the valve guide. Under this circumstance, the valve serves as a relief valve, the relief pressure valve being controlled by appropriate selection of the spring 40. O-ring seal 43 carried in a groove suitably formed about the periphery of valve 13 permits relative axial and rotative movement between the valve 13 and the retaining ring 41 while preventing leakage therebetween.

In order to prevent hydraulic blocking of the action of the valve as a relief valve and also to permit any fluid leaking past the valve to return to the sump, radially extending venting ports 44 are provided in the valve guide 12 to the left of ports 30. These ports communicate at their radially inner ends with an elongated, annular chamber 45 defined by the periphery of the reduced portion of the stem of valve 13 and the adjacent inner wall of guide 12. The ports 44 at their outer ends are in communication with an annular chamber 46 extending about the periphery of guide 12 and having its right wall defined by the left side of flange 34 and its left wall defined by the right end of a shoulder 47 integrally formed with the outer periphery of guide 12. An O-ring seal 48 is carried in a groove suitably formed about the periphery of the retaining member 41 in order to prevent leakage from chamber 45 between the adjacent walls of the member and the chamber portion 22a. Chamber 46 has connected thereto a return line 50 which may be connected to the sump, or where the sump may be under an undesirably high pressure itself, may be arranged to dump to a zone of lower pressure.

Referring now to Fig. 3 wherein a hydraulic system has been illustrated incorporating a three-way valve constructed in accordance with this invention in order to facilitate an understanding of the invention, it will be seen that a gear pump 51 is connected by a line 52 to a sump 53. Pump 51 supplies pressures to the three-way valve of this invention through the line 18 and pressure is communicated to a hydraulic motor 54, exemplified by a piston working against a load, by line 27. Pressure is dumped when ports 30 are aligned with valve ports 31 by suitably rotating valve 13 and returns to reservoir 53. The functions of the other elements are believed to be self-evident.

From the foregoing it will be evident that in the normal operation of the control valve of this invention, pressure is always communicated to the utilization device through the ports 23, the annular passage 26 and the outlet passage 27. However, by rotating the valve by means of the control lever 33 to place the discharge ports 30 connecting to the discharge line 36 in communication with the valve chamber 22 through the valve ports 31 and 32, pressure supplied to the valve through the port 20 at the right end of the valve assembly is returned to the sump. When the valve is not rotated to place the discharge ports in communication with the sump, then the valve is capable of functioning as a relief valve, and when the pressure exerted against the right end of the valve, as viewed in Fig. 1, exceeds the predetermined maximum desired value and causes the spring 40 to be compressed, then the movement of the valve 13 to the left exposes the inner ends of the discharge ports 30 to the chamber 22, thus relieving the pressure. At this point the venting ports 44 prevent hydraulic blocking of the action of the valve.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

What is claimed is:

1. A control valve comprising an axially apertured housing having one end adapted to be placed in communication with a hydraulic system and defining an inlet port to said valve, said housing having a discharge port formed therein intermediate the ends thereof, a generally cylindrical valving member disposed in said housing and in one position adapted to prevent communication between said inlet and said discharge port, flow path defining means formed in said valving member, said valving member being manually rotatable to a second position independently of any axial movement to establish communication between said ports through said flow path defining means, and said valving member being axially shiftable in response to application of excessive fluid pressure thereto from said inlet port to a third position to establish communication between said ports whereby said valving member may function both as a control valve and as a relief valve, and resilient means opposing said axial shifting movement of said valving member, said housing having a vent port therein to prevent hydraulic blocking of the axial shifting movement of said valving member remote from said discharge port, and said control valve further having a utilization port formed in said housing in open and constant communication with said inlet port when said valve member is in any position.

2. A control valve comprising a housing having an axial generally cylindrical chamber formed therein with a spaced radial utilization port, a discharge port, a vent port and an axial inlet port communicating with said chamber, a generally cylindrical valve member rotatably and axially shiftably disposed in said housing and having a reduced diameter portion providing an annular chamber communicating with said vent port and an enlarged portion disposed in generally conforming contact with a portion of the wall of said housing chamber, said valve member having an axial port communicating with said housing chamber and said inlet port and having a radial connecting port for communicating with said discharge port in one radial position of the valve member and being blocked in another radial position, said inlet port and said utilization port being in open communication with each other when said valve member is in any position, a retaining member secured in said housing in conforming relation about part of said valve member reduced diameter portion to provide an axial guide for the valve member in conjunction with said enlarged portion and to block one end of said axial chamber, and a compression spring disposed in said annular chamber and acting between said valve enlarged portion and said retaining member to resiliently hold said valve member in a normal axial position, whereby said valve member is adapted to shift axially against the bias of said spring to act as a maximum pressure relief valve when the valve member is in said another radial position, said vent port preventing hydraulic blocking of the axial shifting of said valve member.

3. A control valve comprising a housing having an axial bore formed therethrough, said housing having an axial inlet passage and radial utilization, discharge and vent passages formed therein communicating with said bore, a sleeve fixed in said bore with the interior of said sleeve providing a generally cylindrical chamber and having an axial port communicating between the chamber and said housing inlet passage, said sleeve having three annular peripheral grooves communicating with the respective utilization, discharge and vent passages and having respective discharge and vent ports communicating between said chamber and said grooves, a generally cylindrical valve member rotatably and axially shiftably disposed in said sleeve chamber and having a reduced diameter portion providing an annular chamber communicating with said vent port and an enlarged portion disposed in conforming contact with a portion of the wall of said sleeve chamber, said valve member having an axial port communicating with said sleeve chamber and said inlet port and having a radial connecting port adapted for communication with said sleeve discharge port in one radial position of said valve member and being blocked in another radial position, said inlet passage and said utilization passage being in open communication with each other when said valve member is in any position, a retaining member secured in said sleeve in conforming relation about part of said valve member reduced diameter portion to provide an axial guide for said valve member in conjunction with said enlarged portion and to block one end of said axial chamber, and a compression spring disposed in said annular chamber and acting between said valve enlarged portion and said retaining member to resiliently hold said valve member in a normal axial position, whereby said valve member is adapted to act as a maximum pressure relief valve against the bias of said spring when the valve member is in said another radial position, said vent port preventing hydraulic blocking of the axial shifting of said valve member.

References Cited in the file of this patent
UNITED STATES PATENTS

| | | |
|---|---|---|
| 231,110 | Smith | Aug. 10, 1880 |
| 1,604,428 | Veeder | Oct. 26, 1926 |
| 1,827,470 | Harrison et al. | Oct. 13, 1931 |
| 1,990,576 | Vincent | Feb. 12, 1935 |
| 2,017,807 | Schmitt | Oct. 15, 1935 |
| 2,103,299 | Ravnsbeck | Dec. 28, 1937 |
| 2,127,679 | Dudley | Aug. 12, 1938 |
| 2,138,767 | Matthews | Nov. 29, 1938 |
| 2,152,021 | Baumer | Mar. 28, 1939 |
| 2,420,394 | Gilman | May 13, 1947 |
| 2,614,794 | Imhoff | Oct. 21, 1952 |
| 2,655,167 | Dunkelow | Oct. 13, 1953 |